(12) United States Patent
Worman et al.

(10) Patent No.: US 6,588,980 B2
(45) Date of Patent: Jul. 8, 2003

(54) UNDERWATER CABLE DEPLOYMENT SYSTEM AND METHOD

(75) Inventors: Peter Johnson Worman, Katy, TX (US); Charles Russell Yemington, Kemah, TX (US); Jason Charles McCanna, Houston, TX (US); James Alan Soliah, Houston, TX (US); David Earl LaPorte, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/858,104

(22) Filed: May 15, 2001

(65) Prior Publication Data

US 2002/0172562 A1 Nov. 21, 2002

(51) Int. Cl.[7] .......................... F16L 1/028; B63B 35/03; G01V 1/00
(52) U.S. Cl. .................... 405/158; 405/154.1; 405/163; 405/168.3; 367/14
(58) Field of Search .............................. 405/154.1, 155, 405/158–160, 163, 168.1, 168.3, 190; 367/14, 15, 19–21; 254/134.3 SC; 114/242, 244, 253, 254

(56) References Cited

U.S. PATENT DOCUMENTS

| | | | | |
|---|---|---|---|---|
| 3,529,786 A | * | 9/1970 | Holden ...................... | 242/388.1 |
| 3,785,503 A | * | 1/1974 | Butterfield et al. .......... | 212/289 |
| 4,298,174 A | * | 11/1981 | Kovaleski ................... | 242/128 |
| 4,537,530 A | * | 8/1985 | Yamamura et al. .......... | 405/160 |
| 4,641,287 A | | 2/1987 | Neeley ......................... | 367/19 |
| 4,721,055 A | * | 1/1988 | Pado .......................... | 114/331 |
| 5,284,323 A | | 2/1994 | Pawkett ..................... | 254/134.3 |
| 5,442,590 A | * | 8/1995 | Svenning et al. .......... | 367/15 X |
| 5,655,753 A | | 8/1997 | Berges et al. ............. | 254/134.3 |
| 5,722,793 A | * | 3/1998 | Peterson .................. | 405/158 X |
| 5,971,665 A | * | 10/1999 | Hughes ...................... | 405/159 |
| 6,024,344 A | * | 2/2000 | Buckley et al. ............ | 367/21 X |
| 6,070,857 A | | 6/2000 | Dragsund et al. ......... | 254/134.3 |
| 6,113,312 A | * | 9/2000 | Norholmen ............. | 405/158 X |
| 6,223,675 B1 | * | 5/2001 | Watt et al. ................... | 114/312 |
| 6,257,162 B1 | * | 7/2001 | Watt et al. ................... | 114/244 |
| 6,260,656 B1 | * | 7/2001 | Orban et al. ............ | 367/191 X |
| 6,276,625 B1 | * | 8/2001 | Chee et al. ................. | 242/360 |
| 6,350,085 B1 | * | 2/2002 | Bath et al. ................ | 405/154.1 |
| 6,371,693 B1 | * | 4/2002 | Kopp et al. ................. | 405/158 |

FOREIGN PATENT DOCUMENTS

EP 231065 * 8/1987 .............. 405/168.3

OTHER PUBLICATIONS

Brown & Root Energy Services; *Hammerhead Jetter Skid*; Operations and Maintenance Manual Engineering Drawings OEM Data; Perry Tritech Inc.; Mar. 2000; (3 p.).

* cited by examiner

*Primary Examiner*—Jong-Suk James Lee
(74) *Attorney, Agent, or Firm*—Conley Rose, P.C.

(57) ABSTRACT

An underwater cable deployment system includes a series of cables, pre-wound on a set of reels, disposed upon a pallet and connected to a distribution hub on the pallet. The pallet is lowered to the ocean floor and a remotely operated vehicle (ROV) is also lowered to the ocean floor to deploy cables to form a predetermined array on the ocean floor. Preferably, the pallet is delivered to the ocean floor in advance by crane with the reel-mounted sensor array cables being deployed later by ROV. Optionally, the ROV may include a jetting package configured to bury the sensor cable as it is being deployed from the reel on the ROV.

34 Claims, 7 Drawing Sheets

UNDERWATER CABLE DEPLOYMENT SYSTEM AND METHOD

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

1. Field of the Invention

The present invention generally relates to a system and method for deploying and installing cable on the ocean floor with a remotely operated vehicle (ROV). More particularly, the present invention relates to a system to use an ROV to deploy and bury cables along the ocean bottom utilizing a series of cables pre-wound on a set of reels.

2. Background of the Invention

Dating back to the first transatlantic telecommunications cables, there has often been a need to lay cable of various configurations for a wide array or purposes in sub-sea environments. Traditional cable laying operations are performed by spooling the cable off of a large reel on the back of a ship as the body of water is traversed. Traditionally, sensor, or data collection, cable is similarly deployed. Although effective for deploying cabling, such ship laid operations leave a lot to be desired when any amount of precision is required in the placement of the laid cable. Whereas transatlantic communications cables are able to perform their functions properly as long as there is a link between the starting and ending points, sensor cable is often required to be in a specific position in order to measure its intended information. One such measurement system that requires relatively complex patterns and precise placement is cabling for the purpose of collecting seismic surveys.

Seismic surveys are conducted for the exploration of hydrocarbon producing zones and reservoirs. One method includes the placing of an array of seismic receivers upon the surface of the earth. When in place, seismic sources are triggered to generate seismic waves that travel downward through the earth and are reflected off of underground deposits or changes in formation. The reflected seismic waves then return upward and are recorded by the seismic receivers at the surface. Data from the generation of the seismic waves at each source to the reception of the seismic waves at each receiver is recorded and is entered into a computer to give the operator an indication of the depth and composition of the formation and any mineral deposits encapsulated therein.

Typical seismic surveys performed today are capable of producing three-dimensional (3-D) surveys of the earth's outer crust. The surveys are generated by placing an array of seismic sensors in the ground prior to drilling, acquiring seismic measurements, and retrieving the array following data acquisition. Drillers then use the data collected by the 3-D seismic array to help find petroleum reservoir deposits and to aid them in making decisions on potential well locations and configurations.

To maximize the production of hydrocarbons from an underground reservoir or formation, it is important to determine the development and behavior of the reservoir during the production life of the reservoir and to foresee changes which will affect the reservoir. More recently, four-dimensional (4-D) seismic survey systems have been used to produce 3-D measurements as before, but over extended periods of time. Such an a arrangement allows production managers to monitor the long term effects of drilling and producing petroleum products from the formation underneath. For example, a production field with several producing wells can be monitored with repeat measurements over time to determine if one well in the field is having an adverse affect on the productivity of another well in the same field. Furthermore, a 4-D seismic array can also keep operators informed as to the amount of petroleum remaining within the reservoir and possible courses of action to maximize its production. Four-dimensional seismic systems allow operators to monitor the long term performance and productivity of their valuable petroleum assets. By obtaining a series of records over time, it is possible to monitor the movement of fluid in and out of the reservoirs, and to thereby obtain reservoir information needed to improve the amount of and the efficiency with which the hydrocarbons are produced.

For long-term recording, it is desirable that the emplaced sensors be substantially stationary throughout their life. Movement in long-term sensors can distort the accuracy of data collected over long periods of time. Any change in position of the sensors may cause inconsistency in the data collected from one time period to another. For example, a production company that desires to monitor a particular reservoir for a period of 20 years needs to ensure that the array of seismic cables has had only negligible positional changes over those 20 years. Furthermore, to maximize seismic array sensitivity, the sensors must be properly coupled to the ocean floor from which they are to measure seismic activity. To prevent sensor movement and to facilitate that proper coupling, seismic cable with attached sensors are preferably buried in the ocean floor thereby embedding the sensors and causing the ocean floor to maintain the sensors' position. For land based arrays, this process is relatively simple, using heavy machinery to dig trenches to bury the sensor array. For subsea seismic, the process is more complicated.

Sub-sea seismic cables are typically deployed off the back of a slowly moving ship. The cable, preferably constructed as a reinforced cable, is loaded upon the deck of the ship in large spools. The seismic sensors are attached to the cable and are of greater diameter than the cable. Therefore, it is important that care be taken while loading and unloading the cable on the large spools. Furthermore, spools must include a large enough inner diameter so as to prevent damage to the sensors when the cable is wrapped thereupon. Once the cable is loaded upon the spools and is on board the ship, the cable can be paid out from the deck of the ship to the ocean floor below. In deep water, the weight of the cable extending from the vessel to the ocean floor together with the movement of the vessel creates substantial tension and stress on the cable. Because the construction of the cabling is relatively delicate, great care must be taken not to over stress the cable as it is laid as the seismic sensor cable experiences its greatest threat of damage during deployment.

Once laid on the floor of the ocean, in order to maximize performance, it is preferred that the sensor cables be buried in a predetermined array on the ocean floor. To accomplish this task, remotely operated vehicles (ROV's) are specially equipped with a jetting package to bury the seismic cable. A jetting package typically includes jet nozzles and a depression arm. The jetting package is designed to be carried underneath an ROV and follow along the path of the laid cable. As the ROV pilot flies the ROV into the ocean floor, following the laid cable, the jet nozzles inject pressurized water into the ocean bottom and, depending on soil composition, either liquefy or create a temporary trench in the ocean floor. As nozzles create the trench or liquefied region, the depression arm pushes the cable into the trench with the loose silt and ocean floor material filling in behind, leaving the cable in a buried state. An example of a jetting package of this type used to bury already-laid cable on the ocean floor in this manner is manufactured by Perry Tritech. Once buried, the seismic cable is now suited to perform seismic readings throughout the life of the field. Because of the time, expense and stresses to the cable, seismic cable is preferably not retrieved and reused following production.

The primary drawback to seismic array systems currently in use for sub-sea environments is their high cost of installation, their low flexibility of placement, and the poor reliability of their sub-sea connections. Because of the manner in which they are laid from a ship, the network of seismic sensors is often constructed as a series of separate cables. A plurality of electromechanical connections are made up on the ocean floor to create the network. Because of the nature of electromechanical connectors in marine and high stress environments, the connections are often characterized by low reliability. It would be preferable for a system to deploy a network of seismic cabling to be developed to either eliminate or reduce the need for electromechanical connectors and to dramatically reduce the stress experienced by the cable while it is being laid. Furthermore, current ship laying cable operations are limited in the pattern of the array that can be laid on the ocean floor. A ship operating in several hundred meters of water cannot lay cable on the ocean floor so as to cause the cable to have precisely angled turns without the use of a piling on the ocean floor around which to direct the cable. Thus prior art systems cannot easily produce precise patterns or complex arrays of cable at the ocean floor, instead being limited to long substantially straight and large radius curved sections. A system to lay a more robust network of seismic cables with greater precision and reduced potential for cable damage would be highly desirable to oilfield exploration and operation companies. The present invention overcomes the deficiencies of the prior art.

BRIEF SUMMARY OF THE INVENTION

The underwater cable deployment system of the present invention includes a remotely operated vehicle (ROV) for deploying a series of cables, pre-wound on a set of reels, on the ocean floor in a preferred sensor array at a desired field of investigation. Preferably all cable connections are made up prior to deployment and placed upon a pallet that is delivered to the desired field of investigation. The pallet preferably includes all equipment (distribution hubs, communication riser, etc.) that are needed to communicate with the sensor array and is delivered to the ocean floor by a crane or other lowering device with the individual sensor array cables on reels to be deployed later by the ROV. The ROV includes a reel deployer configured to pay out and apply back tension to the sensor cable. Optionally, the ROV can include a jetting package configured to simultaneously bury the sensor cable while the cable is paid out. With the sensors deployed and buried, the ROV returns to the surface with a communications riser cable so that a surface facility can interface with and receive data transmissions from the sensor array.

The preferred embodiments of the present invention provide a system to easily and precisely deploy a sub-sea sensor array into various complex sensor patterns using a remotely operated vehicle. By avoiding suspending the cable from the vessel to the ocean floor, the stress experienced by the sensor cable is minimized. Furthermore, the increased precision of the deployment system allows the sensor cables to be laid and buried in predetermined configurations on the sea floor which are not possible with current systems. These and other advantages of the present invention will become apparent on reading the detailed description of the invention in conjunction with the drawings.

BRIEF DESCRIPTION OF THE DRAWINGS

For a detailed description of the preferred embodiments of the invention, reference will now be made to the accompanying drawings in which.

NOTATION AND NOMENCLATURE

During the course of the foregoing and following description, the terms surface and floor are used generically to denote the relative position of certain components with respect to any body of water. Thus, wherever the term "sea floor" is employed, it should be considered synonymous with the bottom of any particular body of water, for example, the floor of an ocean or sea, a riverbed or a lakebed. Furthermore, the term "surface" will refer to the air-water interface of the particular body of water. As will be apparent to one skilled in the art, these and other terms are used to identify the relative position of components of the system, with respect to their placement within the body of water, measured across its depth.

DETAILED DESCRIPTION OF THE PREFERRED EMBODIMENTS

Figure 1:
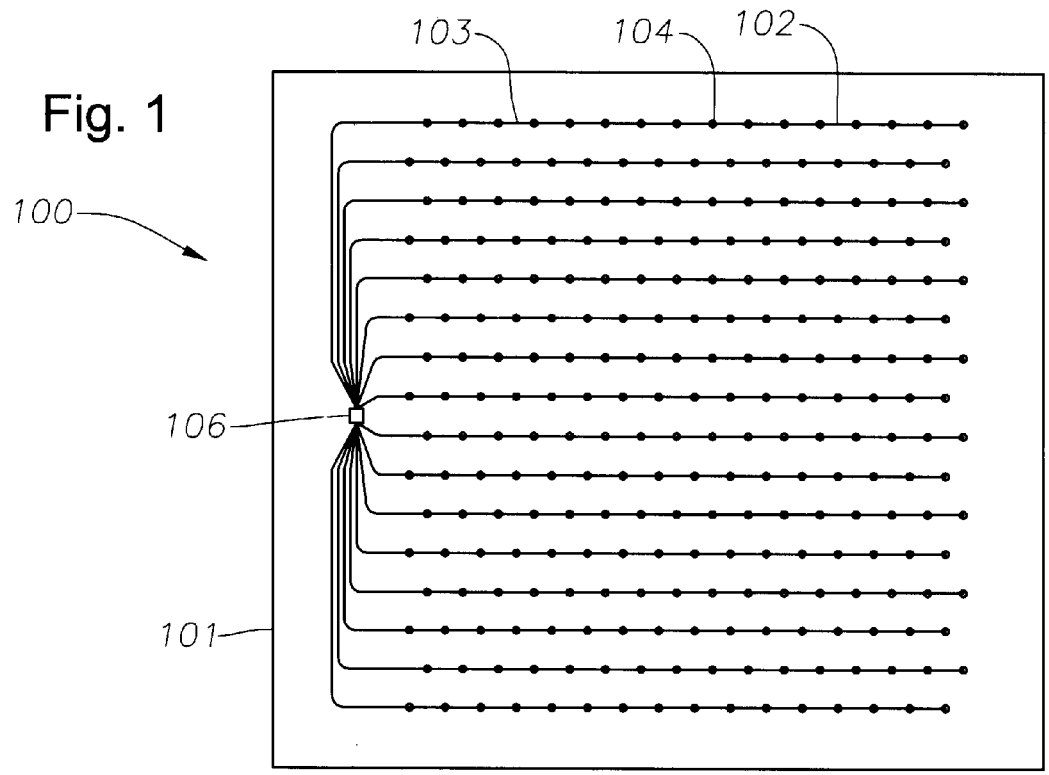
FIG. 1 is a schematic representation of a sensor array deployed in the field of investigation in accordance with a preferred embodiment of the present invention.

Referring initially to FIG. 1, there is shown a sensor (seismic or any other type) array 100 configured by a preferred embodiment of the system of the present invention. Sensor array 100 is laid in a field of investigation 101 and preferably includes a plurality of branches 103, each including a cable having a plurality of spaced sensors 104 disposed thereon. Branches 103 preferably extend from a single communications and deployment package 106. Package 106 provides power and data communication between sensors 104 and a surface facility (not shown) through a communication riser (not shown) extending from the package 106 to the surface.

Figure 2:
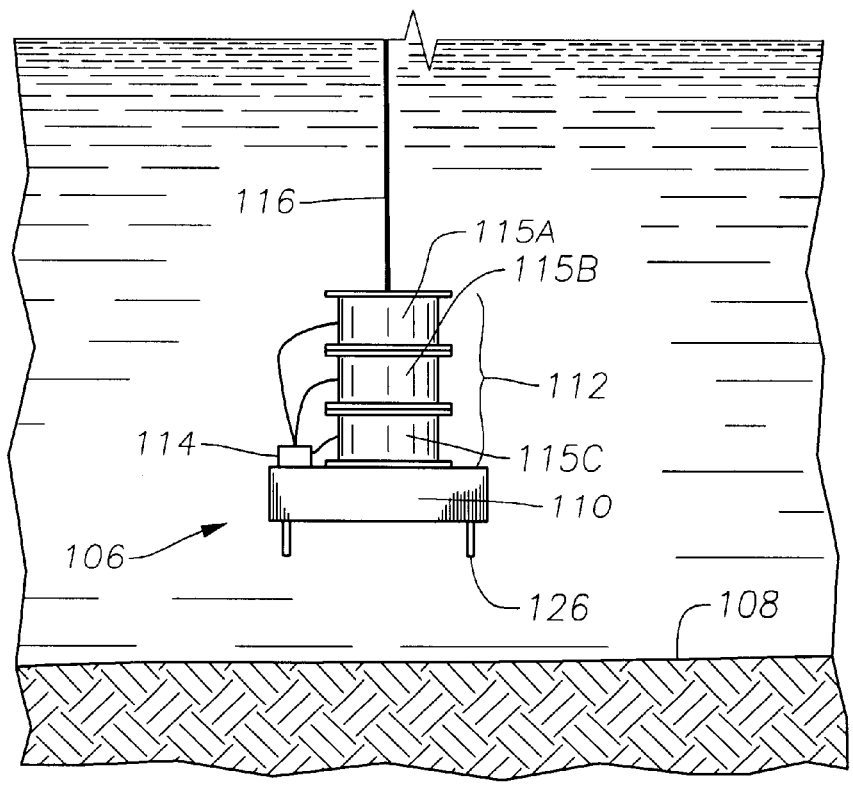
FIG. 2 is an elevational view of a sensor array deployment system being lowered to the ocean floor in accordance with a preferred embodiment of the present invention.
Figure 3:
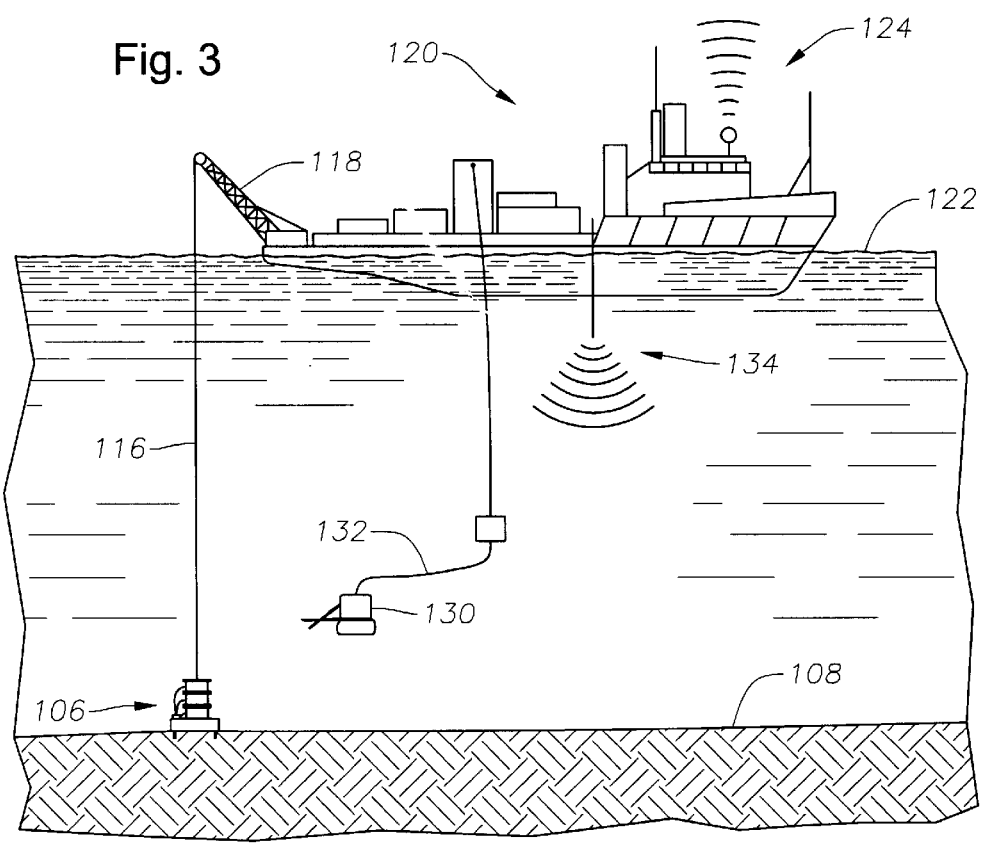
FIG. 3 is an elevational view of a remotely operated vehicle (ROV) and a surface support vessel being used in the deployment of the sensor array deployment system of FIG. 2.

Referring now to FIGS. 2 and 3, communications and deployment package 106 is shown lowered onto the ocean floor 108 by a lift cable 116. Lift cable 116 is deployed from vessel 120 at the ocean surface 122. Surface vessel 120 preferably communicates with a positioning and navigation reference system, such as a Global Positioning Satellite (GPS) network, through a receiver station 124 to determine the actual position of vessel 120 and the deployed package 106. Package 106 includes a pallet base 110, a stack 112 of individual cable reels or spools, as for example three reels 115A, B, C, and a distribution hub 114. FIG. 2 also shows spool 15D that holds a communication riser 107. A sensor cable 102 with sensors 104 as shown in FIG. 1 is wrapped around each of the reels 115 of the communications and deployment package 106. To prevent damage to the cables and sensors, the diameters of reels 115 are sufficiently large so as not apply a significant bending stress to the cable 102 as it is wrapped around the reels 115. Each cable 102 mounted on a reel 115 is terminated at distribution hub 114 so that information from sensors 104 in the cable 102 can be relayed to the surface 122 following installation. With the deployment package 106 on ocean bottom 108, stabs 126 can be used in conjunction with the weight of pallet 110 to help prevent the package 106 from moving from side to side. With package 106 positioned on ocean floor 108, an ROV 130 is deployed from vessel 120 to distribute the cable 102 from reels 112. ROV 130 is connected to vessel 120 by a tether cable 132 and is directed by a pilot on vessel 120.

Figure 4A:
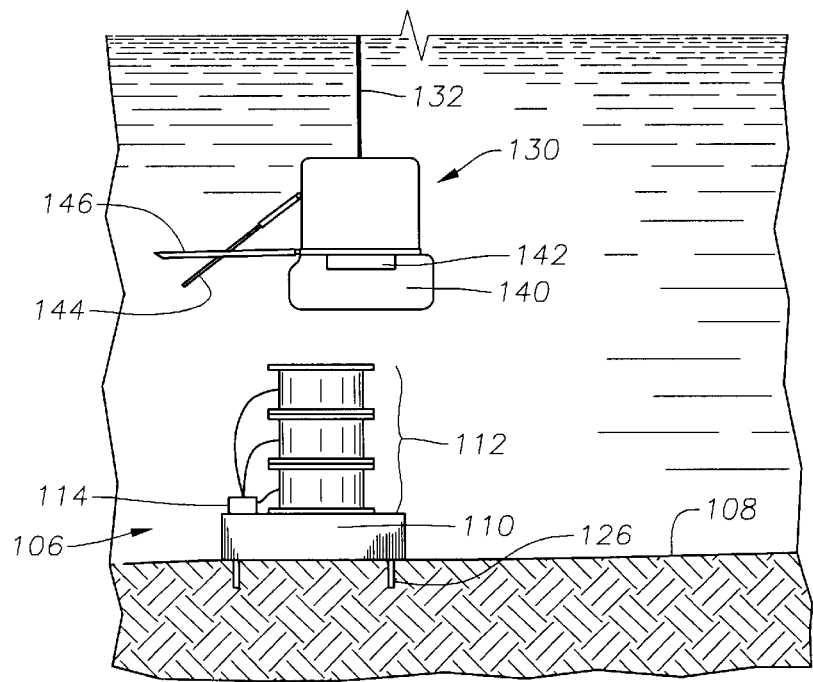
FIG. 4A is an elevational view of the sensor array deployment system of FIG. 2 being approached by the ROV of FIG. 3.
Figure 4B:
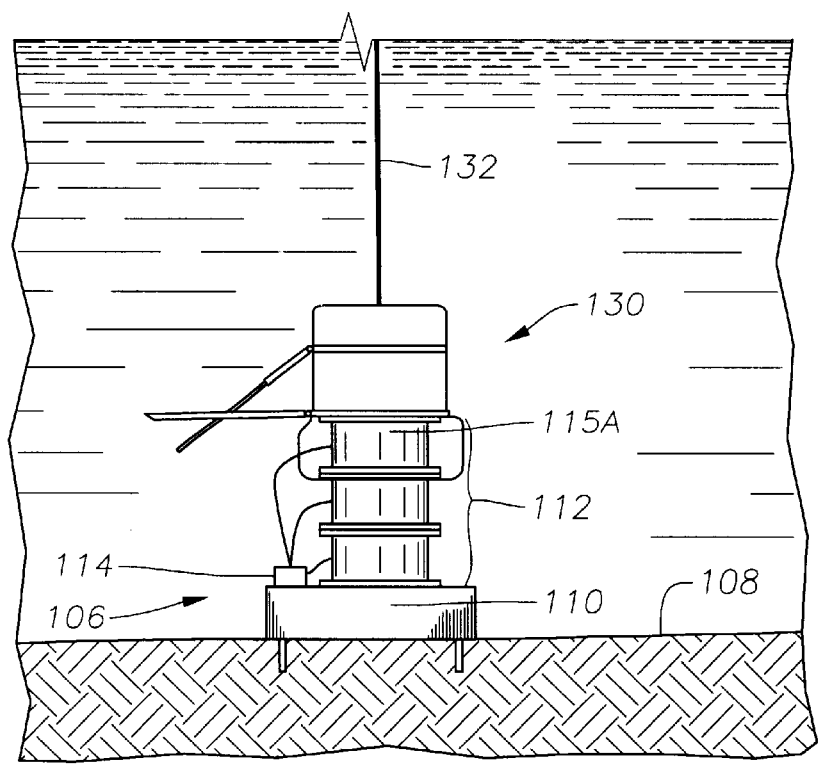
FIG. 4B is an elevational view of the sensor array deployment system of FIG. 2 being engaged by the ROV of FIG. 3.
Figure 4C:
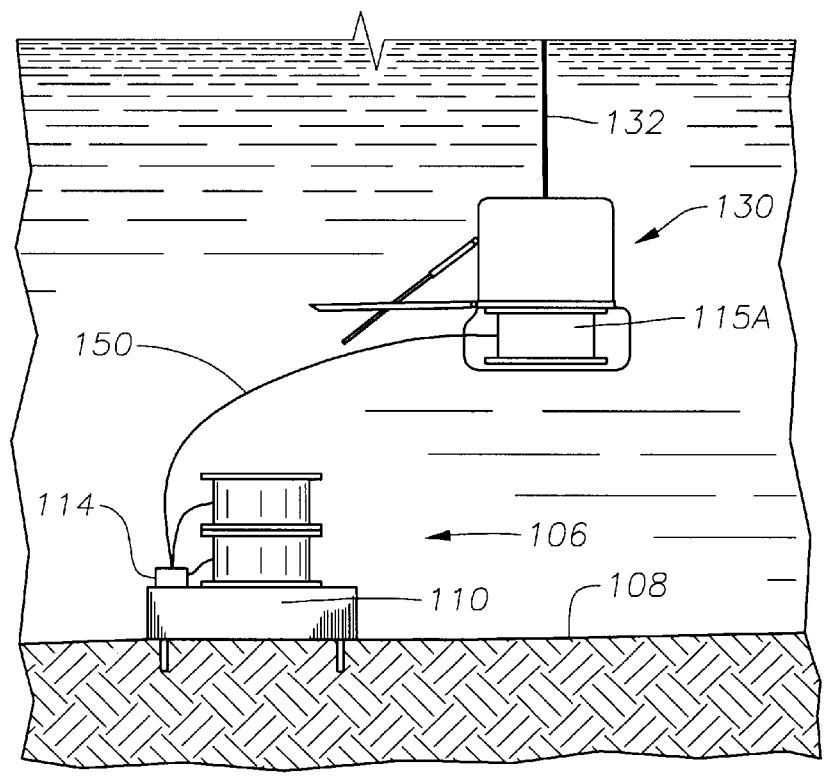
FIG. 4C is an elevational view of the ROV of FIG. 3 deploying the sensor array deployment system of FIG. 2.

Referring now to FIGS. 4A–D, the process by which ROV 130 deploys sensor cable 102 to form array 100 is shown. FIG. 4A depicts ROV 130, equipped with a jetting skid 140, approaching the stack 112 of reels 115 of sensor cable 102 on deployment package 106 on ocean floor 108. ROV 130 includes a reel retainer 142 on its bottom for engaging the cable reels 115 and a jetting skid 140 having a jetting arm 144 and a depression arm 146 extending from the trailing end of the ROV 130. The ROV pilot controls ROV 130 until it is nearly in position above the first of the stack 112 of reels 115 of sensor cable 102. FIG. 4B depicts ROV 130 positioned atop stack 112, in engagement with the top reel 115A. FIG. 4C depicts ROV 130 leaving deployment package 106 with topmost reel 115A rotatably secured thereunder. As ROV 130 is piloted away from deployment package 106, a sensor cable 150 connected at one end to distribution hub 114 unwraps from reel 115A and comes to rest on the ocean floor 108.

Figure 4D:
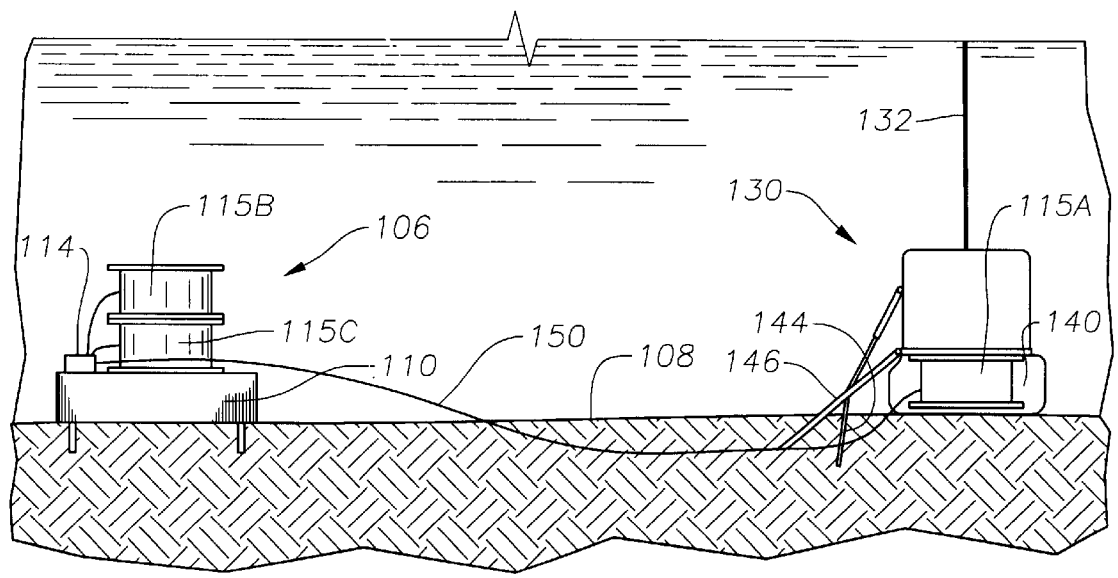
FIG. 4D is an elevational view of the ROV of FIG. 3 deploying and burying cable from the sensor array deployment system of FIG. 2.

Referring specifically now to FIG. 4D, ROV 130 is shown in motion along ocean floor 108, simultaneously deploying and burying cable 150 from reel 115A. As ROV 130 hovers over or skids across ocean floor 108, jetting arm 144 injects water at high pressure into the muddy bottom, thereby creating a void, in the form of a trench or a liquefied soil region, in ocean floor 108 for depression arm 146 to push cable 150 down into the void. With cable 150 depressed into the muddy composition of sea floor 108, ROV 130 continues along its path with loose sediment settling in on top and further burying cable 150. When cable 150 is completely deployed as prescribed, ROV 130 returns to deployment package 106 and releases reel 115A so that another of the remaining reels 115B, 115C can be retrieved and deployed.

Figure 5:
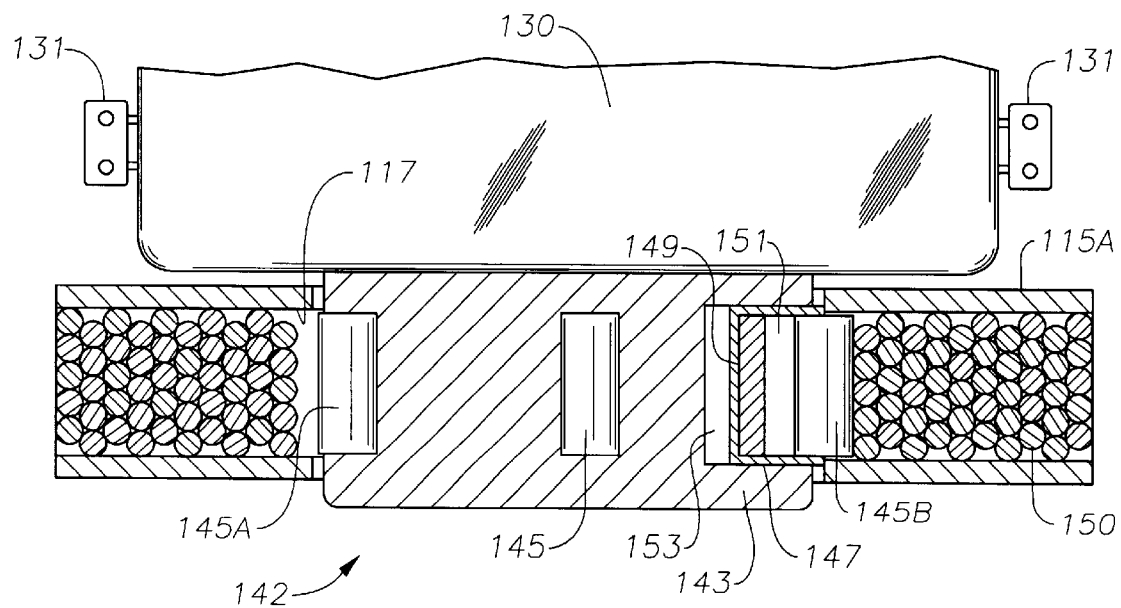
FIG. 5 is a schematic representation of a reel retainment system for the ROV of FIG. 3.

Referring now to FIG. 5, a schematic drawing for a reel retainer 142 is shown. Reel retainer 142 includes a mandrel 143 with a plurality of radially extendable rollers 145 hydraulically mounted thereupon by supports 147 disposed on a piston 149 for hydraulic actuation. Roller 145A is shown in a retracted position within recess 151 while roller 145B is shown extended through hydraulic actuation in chamber 153 on piston 149. Reel 115A has a corresponding inner geometry within its inner diameter that includes a ledge 117, configured to hold reel 115A in place when rollers 145 move from their recessed position to their extended position. With rollers 145 extended, reel 115A is free to rotate about mandrel 143 in either direction about the reel center axis. A drive and braking system (not shown) may be provided such that reel 115A may be forcibly rotated or prevented from rotating in either direction along its axis. One type of drive and braking system includes equipping each roller 145 with a motor or otherwise reversible drive device. Such motors could either be activated in forward or reverse, or even deactivated to allow free spin of reel 115A about mandrel 143. The drive and braking system for reel retainer 142 is activated to maintain cable 150 in the optimum position and tension as it is paid out from reel 115A to the ocean floor 108 thereby allowing ROV 130 to more precisely lay sensor cable 150 during deployment. Additionally, if a relatively large horizontal reel 115A is carried by ROV 130, a restoring force from the ROV 130 may be required to counteract any torque that may act upon ROV 130 from the cable laying operation. Such a restoring force could be applied by horizontal thrusters 131 or by allowing the ROV to "skid" across the ocean floor 108 as cable 150 is deployed. This restoring force allows ROV 130 to maintain proper tension on deployed cable 150 and keep ROV traveling along its intended path.

Referring again to FIGS. 1 and 2, the sensor array 100, as laid out by ROV 130, is shown schematically. As can be seen in FIG. 1, a single deployment package 106 can be delivered to a location with multiple branches 103 of cables 102 with sensors 104 deployable by ROV 130. It should be appreciated that array 100 can be laid out in any pattern and configuration with as many branches 103, sensors 104, and corresponding spools 115 as required to deploy the array. For the arrangement shown in FIG. 1, deployment package 106 includes 16 sensor cable spools 115, each with a branch 103 of sensors 104 mounted on cable 102. Preferably, a seventeenth spool 115D is deployed on package 106 to carry the communications riser 107. Following delivery of package 106 to field 101, ROV 130 deploys each branch 103 of cables 102 and sensors 104 from package 106 in the manner described above. After all sensor branches 102 are deployed, ROV 130 engages the communications riser 107, and extends it to surface facility 120. Alternatively, communications riser 107 may be deployed to the ocean floor 108 within a basket or other retainment means within package 106. Such a deployment would allow ROV 130 to retrieve and transport the communications riser 107 to the surface facility 120 without the added burden of reel 115D. Alternatively still, a communications riser 107 may be deleted in lieu of a data collection device or data recorder that is configured to record measurements over long periods of time. At determined intervals, a retrieval device, for example a specially configured ROV, may be employed to collect the stored data and return it to the surface facility. This type of data communications system may be preferable in certain environments that do not allow for a continuously connected communications riser to be present.

Figure 6A:
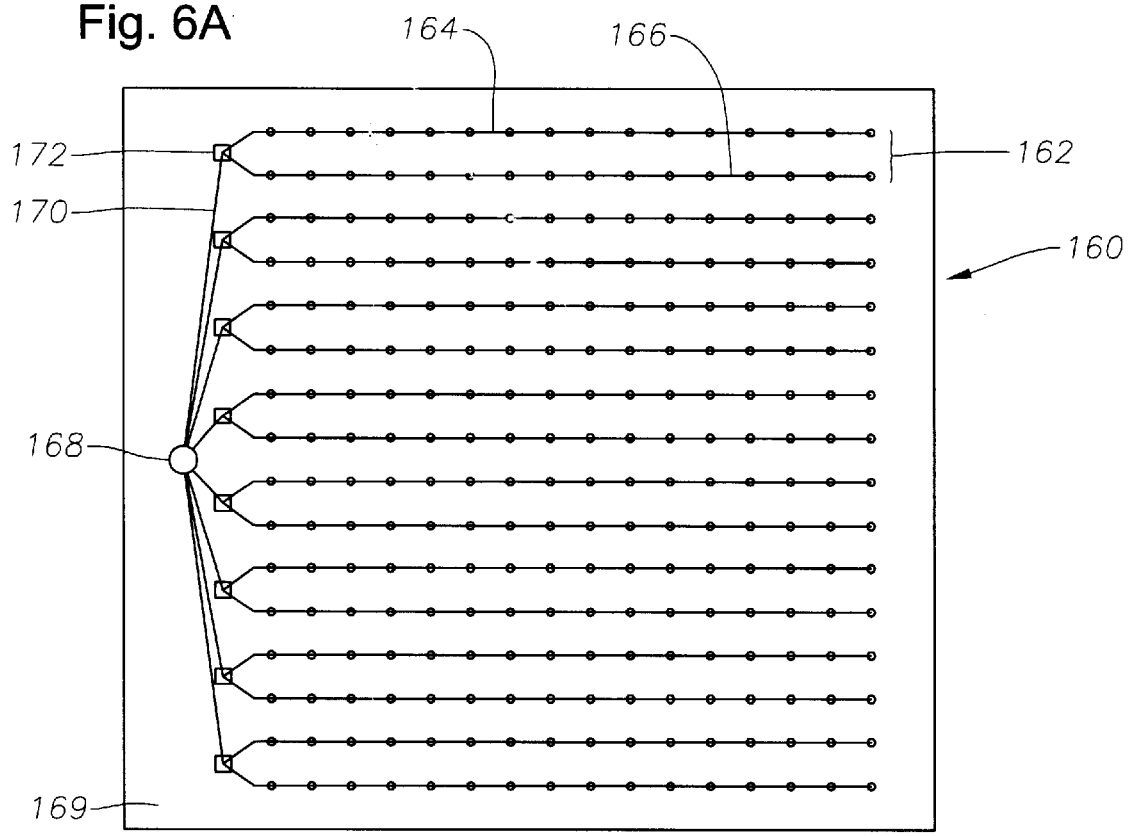
FIG. 6A is schematic representation of a plan view of a first alternative sensor array deployed in accordance with a preferred embodiment of the present invention.

Referring now to FIG. 6A, an alternative sensor array 160 is shown on field of investigation 169. Array 160 is preferably constructed of a series of paired branches 162. Each paired branch 162 includes first and second cable legs 164, 166 and is connected to a central deployment package 168 by a communications cable leg 170. Each sensor leg 164, 166 preferably includes any number of sensors, although 16 are shown. Ideally, to eliminate the need for sub-sea connectors, the entire system is delivered to location 169 by a surface vessel with each branch 162 located on its own pallet 172. Then, while system 160 is on the ocean floor 108, an ROV 130 is used to first relocate, and then deploy branches 162 to their desired locations. Using such an arrangement, each branch 162 is constructed using a pallet 172 with two reels, one for each leg 164 and 166, with the communications leg 170 preferably being made by a reinforced cable. Reinforced cable used to make communications leg 170 would preferably automatically spool from a box or retainer as it is pulled away from a secured end on deployment package 168. An example of such an automatically spooling cable for use for communications leg 170 would be what is commonly called a "torpedo" cable. It is preferred that communications leg 170 be manufactured of a reinforced cable in order to be resistant of any tension or wear that it may experience during deployment. Once the location 172 is reached, ROV 130 releases pallet 172 and then proceeds to deploy and bury cable legs 164 and 166 as described above.

Alternatively, each paired branch 162 may be delivered to its approximate location on a pallet (not shown) that contains three reels (not shown). The first two reels contain cable legs 164, 166 while the third reel contains communications cable leg 170. Legs 164, 166 are deployed and buried as described above in reference to FIGS. 4A–D with the communications leg 170 being similarly deployed thereafter. After each branch 162 is deployed, connection legs 170 are connected to deployment package 168, from which a communications riser (not shown) is extended to the surface.

Figure 6B:
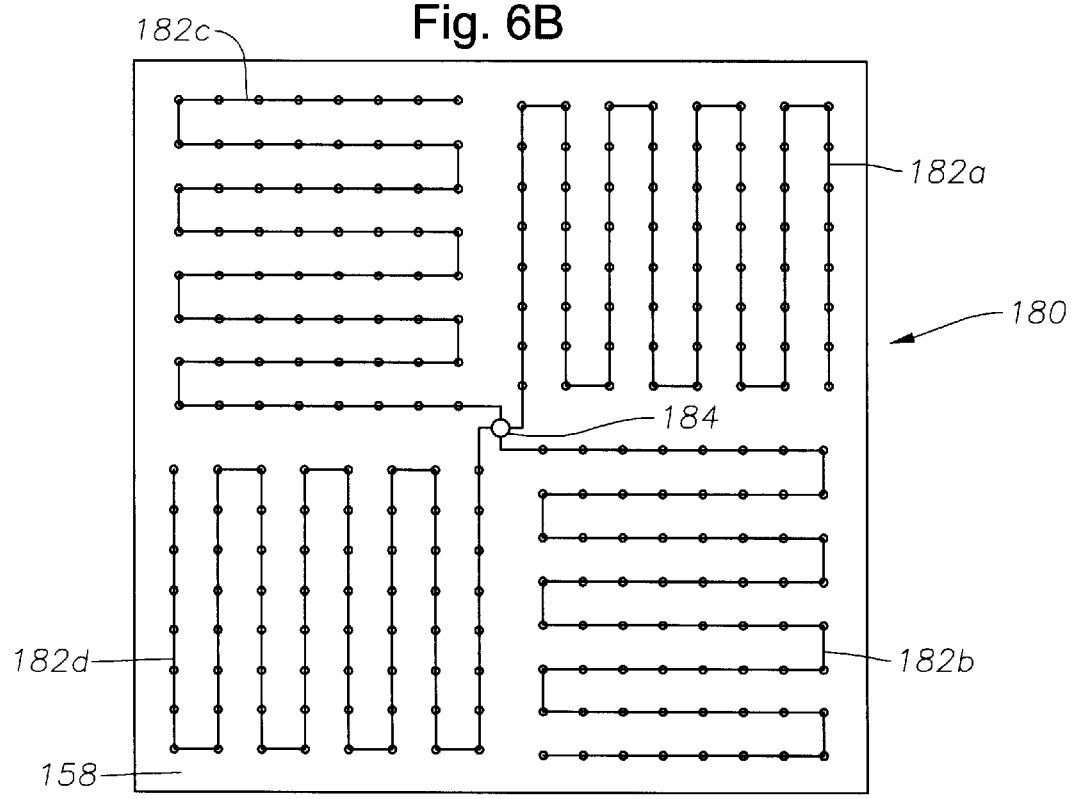
FIG. 6B is schematic representation of a plan view of a second alternative sensor array deployed in accordance with a preferred embodiment of the present invention.

Referring now to FIG. 6B, another alternative sensor array 180 is shown for a field 158. For purposes of comparison, sensor spacings and locations similar to those used for array 160 are used in constructing array 180 with the exception that array 180 is constructed with 4 sensor legs 182A–D with 64 sensors each. Array 180 with its four legs 182A–D are deployed to field 158 by a single deployment package 184 with a communications riser (not shown). Using this arrangement, deployment package 184 can be delivered to the ocean floor over field 158 including a pallet with 5 reels, one for each sensor leg 182A–D and a fifth for the communications riser. ROV 130 is piloted to lay out each leg 182 in the array 180 as described above, burying the sensor cable as it is laid. When all four legs 182 are properly deployed, ROV 130 engages the communications riser and extends it to the surface.

Array 180 has several advantages over array 160 of FIG. 6A, including the ability to cover field 158 with fewer sensor legs and without the use of any sub-sea connectors. Using fewer sensor cable legs 182 with more sensors per leg reduces the assembly and installation costs. Rather than make up 16 connections and deploy 16 sensor reels, the array 180 only requires 4 reels. Importantly, array 180 of FIG. 6B is capable (along with arrays 100, and 160 of FIGS. 1 and 6A) of being completely assembled, hard wired, sealed, and tested at the surface and deployed sub-sea without the need to make-up any connections. The complex pattern or layout of array 180 is only possible because of the maneuverability of using ROV 130 to lay the cables 102 rather than a vessel.

In comparison with array 160 of FIG. 6A, array 180 of FIG. 6B employs four sensor cable legs with 64 sensors each to cover the same field 158 as array 160 with its 16 cable legs of 16 sensors each. This comparison illustrates the amount of precision and complexity that may be employed in using the deployment system of the present invention. Whereas current capabilities for laying sensor cable exist that may be able to approximate the detail and configuration of array 160 of FIG. 6A, no system presently exists that is capable of laying cable in an arrangement as complex and precise as array 180 of FIG. 6B.

Figure 7:
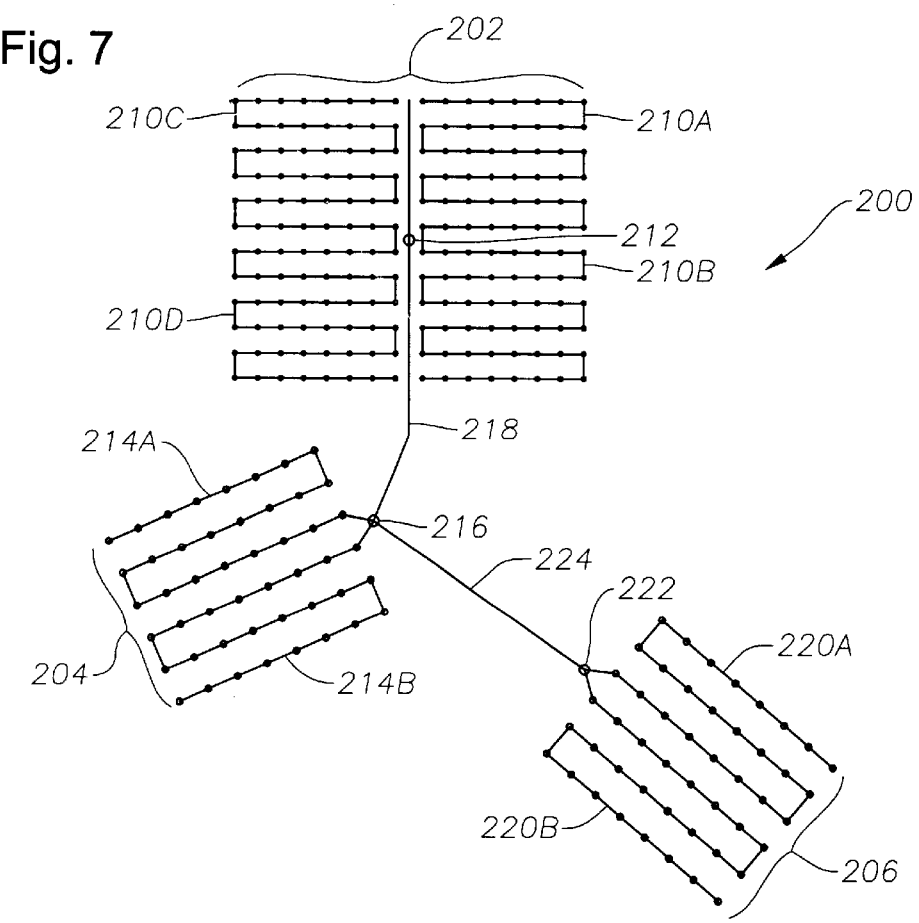
FIG. 7 is a schematic representation of a plan view of a sensor array deployed in accordance with an alternative embodiment of the present invention.

Referring now to FIG. 7, there is shown an array 200 for multiple fields of interest. Array 200 is divided into regions 202, 204, and 206. The portion of array 200 that covers region 202 is similar in size and configuration to array 180 of FIG. 6B, including 4 branches 210A–D and a center hub 212 with a communications riser (not shown) that communicates with a surface facility (not shown). Array portion 204 has two branches 214A, 214B and is connected to portion 202 through a hub 216 and a communications cable 218. Furthermore, array portion 206 also has two branches 220A, 220B and is connected to hub 216 of portion 204 through a third hub 222 and a second communication cable 224. Because of their relative small size and connectivity through cables 218 and 224, portions 204, 206 can be placed around sub-sea obstacles, such as mooring lines and anchors, that may exist on the ocean floor. Because communications cables 218 and 224 do not need to be buried to perform their functions properly, they can be laid along the ocean bottom around and over any obstacles that may be present.

Referring now to FIGS. 7–9C, a distribution package 230 for delivering an array 200 to the sea bottom and deployment scheme is shown. As shown, package 230 is delivered by a lift wire 233 from a surface vessel (not shown) and includes equipment for portions 202, 204, and 206 in a 3-section stacked arrangement, with each section of the "stack" resembling the deployment package 106 of FIGS. 2 and 4D. Portion 202 includes spools forming branches 210A–D as well as a spool 231 containing a communication riser 107. Portions 204 and 206 contain spools forming branches 214A–B and 220A–B respectively, but do not require additional spools for communication risers. Each section 202, 204, 206 contains communication hubs 212, 216, and 222 respectively. Additionally, section 202 includes a pallet 232 that is deposited on the ocean floor where center hub 212 of array portion 202 is desired.

Figure 9A:
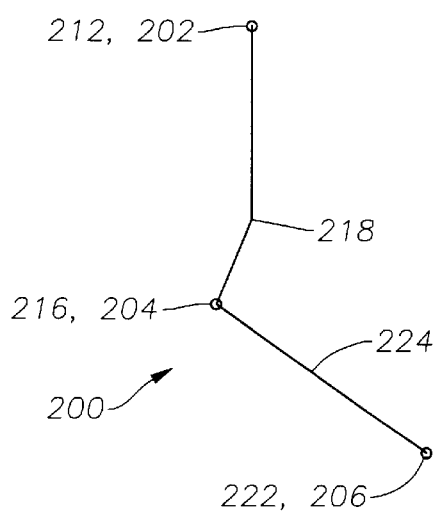
FIG. 9A is a schematic representation of a plan view of the three-section sensor array of FIG. 8 with no sensor branches deployed.

Once package 230 is deposited, a catch is released (by a remote mechanism or an ROV, such as ROV 130) and the surface vessel lifts remaining sections 204 and 206 at the end of lift wire 233, leaving section 202 on the ocean floor. Then, with piloting assistance from the ROV, the surface vessel lifts and transports sections 204 and 206 attached to lift wire 233 to the desired location for center hub 216 of array portion 204. Meanwhile a reinforced communications cable 218 is paid out between released section 202 and traveling section 204. Many types of cable and deployment methods may be used for communications link 218, but it is preferred that the method require little, if any, operator interaction to perform. With portions 204 and 206 in place at location 216, a second catch is released, thus allowing lift wire 233 to leave section 204 in place and transport section 206 to the desired location for center hub 222 of array portion 206, paying out reinforced cable 224 therebetween. FIG. 9A shows array 200 after each portion 202, 204, and 206 has been delivered to their desired positions 212, 216, and 222 respectively, connected together by reinforced communications cables 218 and 224.

Figure 9B:
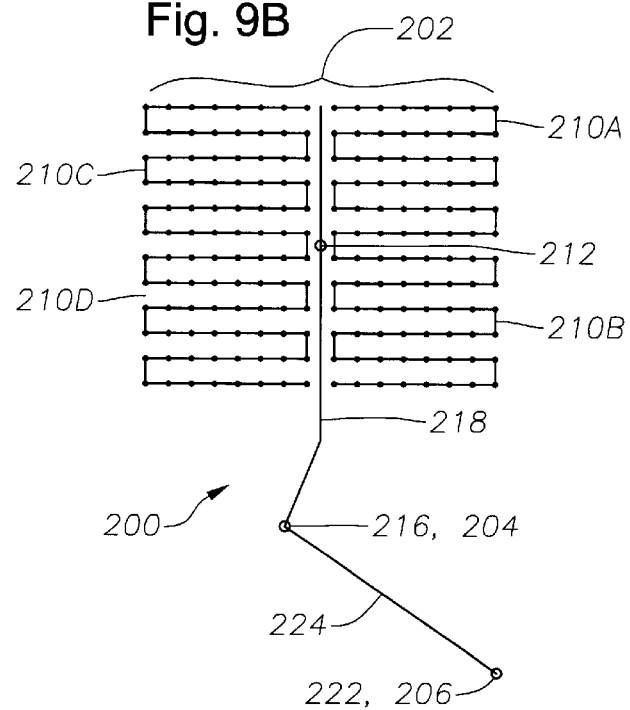
FIG. 9B is a schematic representation of a plan view of the three-section sensor array of FIG. 8 with sensor branches for the first section deployed.
Figure 9C:
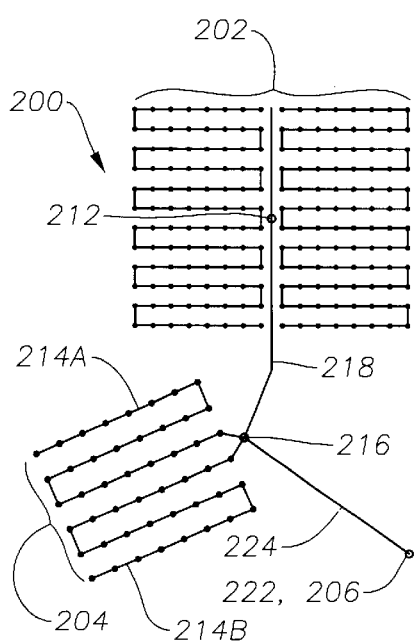
FIG. 9C is a schematic representation of a plan view of the three-section sensor array of FIG. 8 with sensor branches for two sections deployed.
Figure 8:
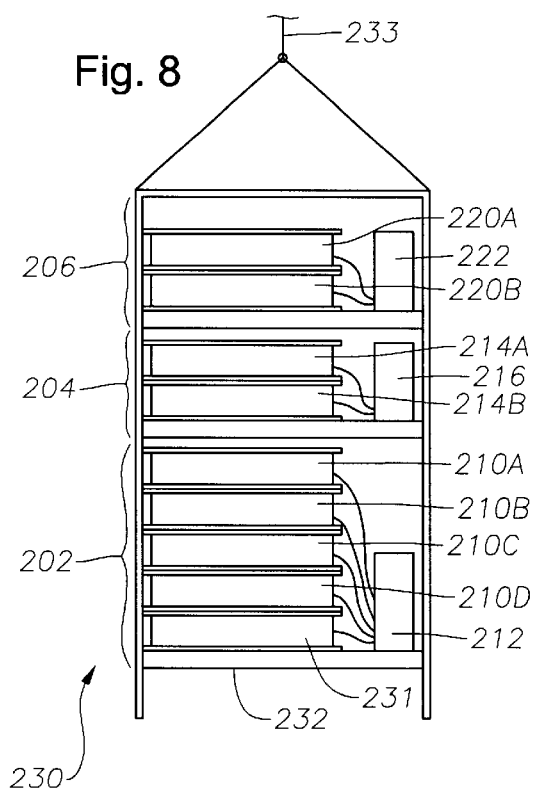
FIG. 8 is an elevation view of a three-section sensor array packaged for deployment in accordance with the system of FIG. 7.

Referring specifically now to FIG. 9B, the ROV engages those spools which contain branches 210A–D and deploys them as described above with respect to FIGS. 4A–D to create section 202 of sub-sea array 200. Because the ROV is highly maneuverable, tight turns and other complex geometries may be used to place the sensors of branches 210A–D around obstacles and in their optimal spacings. When finished with branches 210A–D, ROV 130 travels to hub 216 and then proceeds to deploy branches 214A–B of section 204 of array 200 as shown in FIG. 9C. Next, ROV 130 proceeds to hub 222 of portion 206 of array 200 to deploy branches 220A–B as shown in FIG. 7. With all branches 210A–D, 214A–B, and 220A–B properly deployed to form array 200, ROV 130 returns to hub 212, grasps communication riser reel (231 of FIG. 8) and extends it to a surface facility. With the communications riser extended to the surface facility, array 200 is complete and ready for operation.

Figure 10:
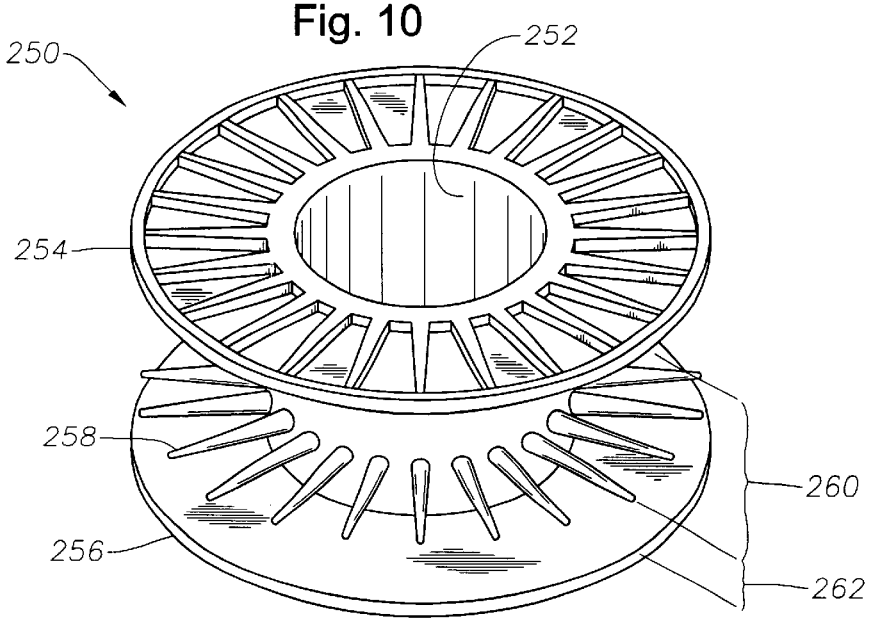
FIG. 10 is an isometric view drawing of a sensor reel configured to deploy the sensor branches of FIGS. 9A–B.

Referring finally to FIG. 10, a preferred sensor cable reel 250 is shown. Sensor cable reel 250 includes an inner diameter 252, two outer flanges 254, 256, and a plurality of partition tines 258. Partition tines 258 effectively divide the storage capacity of reel 250 into two sections, 260 and 262. Section 260 is for the storage of the portion of a sensor cable (not shown) that does not contain sensors, while portion 262 is for the storage of portions that do contain sensors. Because sensors integrated into cabling often have an outer diameter that is larger than that of the cable that carries them, spooling such a sensor cable upon a traditional reel can overstress portions of a tightly wound cable.

To reduce the spooling stress of a sensor cable, the reel 250 of FIG. 10 may be used. During the spooling operation, plain, sensor-free lengths of cable are wound upon section 260 of reel 250. When an attached sensor is reached, the cable is fed between two adjacent tines 258 and the portion of the cable with the sensor mounted thereupon is wound within section 262. Once the sensor is passed, the cable is again re-routed through a pair of adjacent tines 258 and the cable again wound around reel 250 within section 260. This arrangement allows the cable to be tightly wound upon reel 250 without the potential for damaging any sensors that may be attached. Because of the configuration of reel 250, when the cable is unwound, the process is automatic, with cable and sensors being released from sections 260 and 262 without any additional operator or ROV intervention.

The arrays and their deployment methods of FIGS. 1–10 have numerous advantages over systems currently available. Primarily, because the cables for arrays 100, 160, 180, and 200 can be pre-assembled and wound onto reels without any connectors, the arrays can be assembled and tested on shore and then shipped to the deployment site as an integrated unit. Because arrays 100, 160, 180, 200, and the like are deployed subsea by an ROV 130 at a minimal height above the ocean floor, there is low risk of installation damage as the cables are not subjected to tension and the sensors are not gripped by tensioners. Because the cables and sensors are not subjected to elevated stresses, cable assemblies can be optimized to save fabrication costs by reducing the size of their reinforcement members and optimizing them for the sensors mounted thereon. As the cables are so optimized, the total length of cable and number of sensors on any given leg may be greatly increased over legs of typical prior art sub-sea cabling. If typical reinforced cable were to be used, the ROV's carrying capabilities would limit the length of cable and the number of sensors that could be used for each sensor leg. Therefore, as the amount of reinforcement of the cable in a sensor leg is reduced, the length of cable able to be carried by the ROV is so increased. Furthermore, the lack of sub-sea connectors allows for an extensive network of sensor cables to be laid with a single communications riser and reduced likelihood of post-deployment failure. If post-deployment failure does occur in any one of the sensor cables, a new cable can be lowered upon a reel, deployed by a remotely operated vehicle, and connected by another ROV in place of the defective cable to the distribution hub.

A final advantage of having an ROV deployed sensor array is that precise positioning of the cables is possible. Remotely operated vehicles are capable of laying sensor cable in complex patterns with positional tolerances that are much improved compared to ship laid cabling and limited only by the design of the survey system. The ROV is capable of making sharp turns and its movements are not affected by water currents and surface wave action. ROV deployment also allows for the laying of sensor cabling around obstructions, including anchors, mooring lines, and sub-sea construction equipment. Additionally, because the system is deployed by an ROV, it can be delivered ahead of schedule and deployed when convenient or when all nearby construction is completed. Furthermore, the array may be deployed partially, with the remainder of the sensor cables being deployed when it is convenient or when needed.

The above discussion is meant to be illustrative of the principles of the present invention. Numerous variations and modifications will become apparent to those skilled in the art once the above disclosure is fully appreciated. It is intended that the following claims be interpreted to embrace all such variations and modifications.

What claimed is:

1. A method for deploying an array containing at least one cable on an ocean floor, comprising:
   disposing the at least one cable on a reel;
   connecting one end of the at least one cable to a subsea hub;
   mounting the reel on a remotely operated vehicle;
   deploying the vehicle in a predetermined configuration on the ocean floor; and
   paying out the cable as the vehicle is deployed across the ocean floor to form the array.

2. The method of claim 1 wherein the remotely operated vehicle further includes a jetting package and depression members adapted to bury the cable in the ocean floor.

3. The method of claim 2 further comprising simultaneously burying and paying out the cable while the remotely operated vehicle is deployed across the ocean floor.

4. The method of claim 1 further comprising placing the reel onto a pallet and lowering the pallet from a deployment vessel to the ocean floor.

5. The method of claim 4 wherein the pallet is configured to remain upon the ocean floor following deployment of the cable.

6. The method of claim 4 wherein a data collection device is connected to each of the cables, the data collection device being configured to store measurements for retrieval at a later date.

7. The method of claim 1 wherein the cable is paid out from the reel at a height less than 3 meters above the ocean floor.

8. A method for deploying an array containing at least one cable on an ocean floor, comprising:
   disposing the at least one cable on a reel:
      placing the reel onto a pallet and lowering the pallet from a deployment vessel to the ocean floor;
      mounting the reel on a remotely operated vehicle;
      deploying the vehicle in a predetermined configuration on the ocean floor;
      paying out the cable as the vehicle is deployed across the ocean floor to form the array;
      wherein the pallet is configured to remain upon the ocean floor following deployment of the cable; and
      wherein the pallet is constructed with at least one removable section.

9. The method of claim 8 wherein the removable section includes at least one reel with cable wrapped thereupon and a communications link to communicate with a communications hub on the pallet.

10. The method of claim 9 wherein the communications link is a torpedo cable.

11. The method of claim 9 wherein the communications link is a reinforced cable.

12. The method of claim 9 wherein the removable section is guided by the remotely operated vehicle to another location on the ocean floor.

13. A method for deploying an array containing at least one cable on an ocean floor, comprising:
   disposing the at least one cable on a reel:
      placing the reel onto a pallet and lowering the pallet from a deployment vessel to the ocean floor;
      mounting the reel on a remotely operated vehicle;
      deploying the vehicle in a predetermined configuration on the ocean floor;
      paying out the cable as the vehicle is deployed across the ocean floor to form the array; and
      wherein a distribution hub is connected to each of the cables, the distribution hub being in communication with a surface facility through a communications riser.

14. The method of claim 13 wherein any connection made between the distribution hub and the cables is made prior to the deployment of the array to the ocean floor.

15. The method of claim 13 wherein the distribution hub is attached to the pallet.

16. The method of claim 13 wherein connections between the distribution hub and the cables and between the distribution hub and the communications riser are made prior to delivery to the ocean floor.

17. The method of claim 13 wherein the communications riser is deployed to the ocean floor on the pallet with the reels.

18. The method of claim 17 further comprising engaging the riser with the remotely operated vehicle and piloting it to the surface facility while paying out the communications riser.

19. A method for deploying a sensor array to a field of investigation upon a sea floor, the array including a plurality of sensors disposed on at least one sensor cable, the method comprising:
   wrapping the at least one cable upon a sensor reel;
   placing the sensor reels with cables mounted thereon to a pallet;
   connecting one end of the at least one cable to a subsea hub;
   lowering the pallet from a deployment vessel to the field of investigation;
   dispatching a remotely operated vehicle to the field of investigation, the vehicle including jetting and depression devices;
   the remotely operated vehicle receiving the sensor reels and paying out the sensor cable as the vehicle is piloted across the field of investigation; and
   burying the sensor cable with the jetting and depression devices of the remotely operated vehicle as the sensor cable is paid out.

20. A sensor array to be deployed on the ocean floor at a first field of investigation, the array comprising:
   a plurality of sensor cables, each of said cables including a plurality of sensors integrally mounted thereupon;
   each of said sensor cables wrapped around a corresponding sensor reel;
   one end of each of said sensor cables connected to a subsea hub;
   said sensor reels configured to be rotatably attached to a remotely operated vehicle, ROV; and
   said ROV configured to deploy said sensor cables from said sensor reels when piloted along a path across the ocean floor.

21. The sensor array of claim 20 wherein said sensor reels comprise a first portion and a second portion, said first portion and said second portion being separated by a plurality of radial tines with said first portion configured to retain said integrally mounted sensors and said second portion configured to retain said sensor cables.

22. The sensor array of claim 20 wherein the subsea hub is a communications hub and further comprising a pallet containing the communications hub, said pallet configured to be lowered to the ocean floor after the one end of each of said sensor cables is connected to the communications hub.

23. The sensor array of claim 22 wherein said sensor reels are disposed upon said pallet and terminated at said communications hub.

24. The sensor array of claim 23 wherein said pallet is constructed with at least one removable section, said removable section including at least one sensor reel and a communications link, said communications link terminated at said communications hub.

25. The sensor array of claim 24 wherein said removable section is configured to be transported to a second field of investigation.

26. The sensor array of claim 25 wherein said removable section is guided to said second field of investigation by said ROV.

27. The sensor array of claim 25 wherein said ROV deploys the sensor cable from said reel from said removable section once said removable section is delivered to said second field of investigation.

28. The sensor array of claim 25 wherein said communications link includes a torpedo cable.

29. The sensor array of claim 25 wherein said communications link included a reinforced cable.

30. The sensor array of claim 22 wherein said pallet includes a data recording device connected to said communications hub, said recording device configured to store measurements for retrieval at a later date.

31. A sensor array to be deployed on the ocean floor at a first field of investigation, the array comprising:

a plurality of sensor cables, each of said cables including a plurality of sensors integrally mounted thereupon;

each of said sensor cables wrapped around a corresponding sensor reel;

said sensor reels configured to be rotatably attached to a remotely operated vehicle, ROV;

said ROV configured to deploy said sensor cables from said sensor reels when piloted along a path across the ocean floor;

a pallet containing a communications hub, said pallet configured to be lowered to the ocean floor; and wherein said pallet includes a communications riser, said riser being connected to said communications hub and adapted to be extended to a surface facility.

32. The sensor array of claim 31 wherein said communications riser is configured to be received by said ROV and delivered to said surface facility.

33. A sensor array to be deployed on the ocean floor at a field of investigation, the array comprising:

a plurality of sensor cables, each of said cables including a plurality of sensors integrally mounted thereupon;

one end of the cables connected to a subsea hub;

each of said sensor cables wrapped around a corresponding sensor reel;

said sensor reels configured to be received by a remotely operated vehicle, ROV; the ROV including jetting and depression devices; and said ROV configured to simultaneously bury and deploy said sensor cables from said sensor reels when piloted along a path across said field of investigation.

34. A method for deploying a sensor array to a field of investigation upon a sea floor, the array including a plurality of sensors disposed on at least one sensor cable, the method comprising:

wrapping each sensor cable upon a sensor reel;

placing the sensor reels with cables mounted thereon onto a pallet, the pallet including a communications hub connected to a communications riser;

lowering the pallet from a deployment vessel to the field of investigation;

dispatching a remotely operated vehicle, ROV to the field of investigation, the ROV receiving the sensor reels and paying out the sensor cable as the ROV is piloted across the field of investigation;

the ROV further adapted to bury the sensor cable as it is deployed from the sensor reel to the sea floor; and burying the sensor cable with the ROV while the sensor cable is deployed.

* * * * *